United States Patent [19]

Burdyn et al.

[11] 4,004,638

[45] Jan. 25, 1977

[54] OIL RECOVERY BY ALKALINE-SURFACTANT WATERFLOODING

[75] Inventors: Ralph F. Burdyn; Harry L. Chang; Evin L. Cook, all of Dallas, Tex.

[73] Assignee: Mobil Oil Corporation, New York, N.Y.

[22] Filed: Apr. 23, 1975

[21] Appl. No.: 570,686

[52] U.S. Cl. ............................ 166/273; 252/8.55 D
[51] Int. Cl.² ........................................ E21B 43/22
[58] Field of Search .................. 166/273, 274, 275

[56] References Cited

UNITED STATES PATENTS

| 3,298,436 | 1/1967 | McCardell | 166/270 |
|---|---|---|---|
| 3,330,347 | 7/1967 | Brown et al. | 166/270 |
| 3,414,053 | 12/1968 | Treiber et al. | 166/273 |
| 3,437,141 | 4/1969 | Brandner et al. | 166/273 |
| 3,623,553 | 11/1971 | Burdge | 166/275 |
| 3,648,771 | 3/1972 | Kelly et al. | 166/273 |
| 3,731,741 | 5/1973 | Palmer et al. | 166/274 |
| 3,777,817 | 12/1973 | Feuerbacher et al. | 166/273 |
| 3,837,400 | 9/1974 | Martin | 166/274 |

OTHER PUBLICATIONS

Jennings, "A Caustic Waterflooding Process For Heavy Oils", Journal of Petroleum Technology, Dec. 1974, pp. 1344–1352.

*Primary Examiner*—Ernest R. Purser
*Attorney, Agent, or Firm*—C. A. Huggett; William D. Jackson

[57] ABSTRACT

Recovery of oil from subterranean oil reservoirs by waterflooding employing an alkaline agent and a sulfonate surfactant. An aqueous initiation slug containing an alkaline agent selected from the group consisting of alkali metal and ammonium hydroxides is injected into the reservoir via a suitable injection system. Thereafter an aqueous surfactant slug is injected into the reservoir behind the initiation slug. The surfactant slug contains a sulfonate surfactant and an alkaline agent. Subsequent to injection of the surfactant slug, an aqueous flooding medium is injected in order to displace the oil within the reservoir to a production system from which it is recovered. A portion of the flooding medium may contain a thickening agent for mobility control purposes.

18 Claims, 3 Drawing Figures

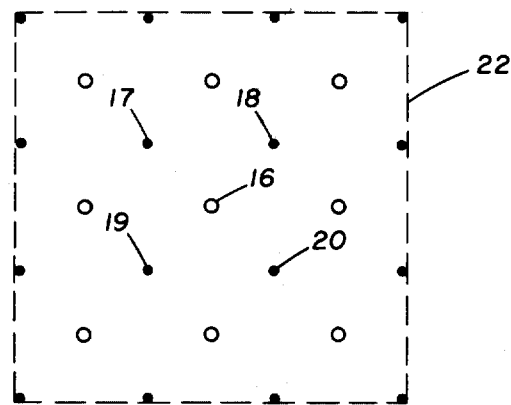
FIG. 3
FIG. 1
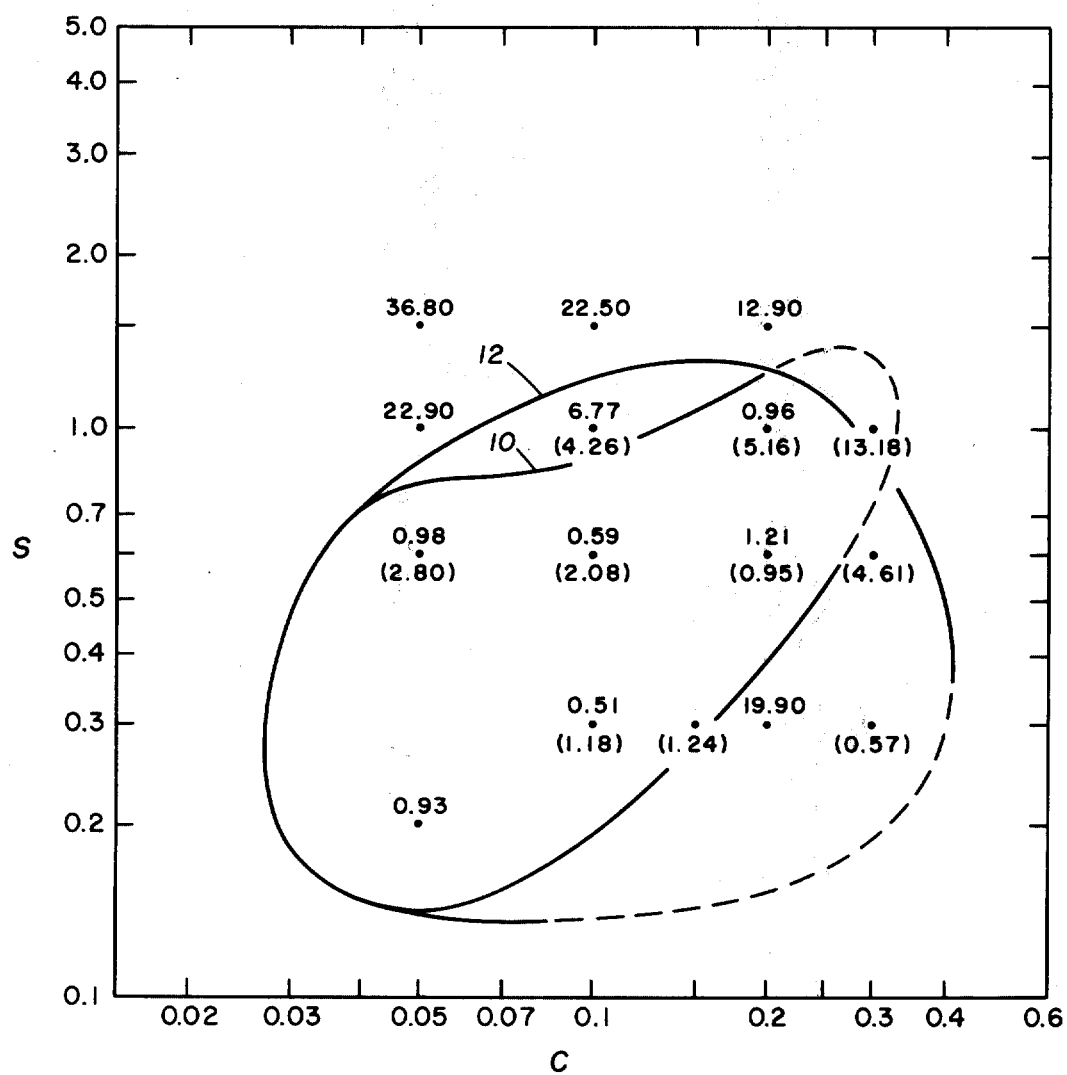

OIL RECOVERY BY ALKALINE-SURFACTANT WATERFLOODING

BACKGROUND OF THE INVENTION

This invention relates to the recovery of oil from subterranean oil reservoirs and more particularly to improved waterflooding operations employing alkaline agents in conjunction with sulfonate surfactants.

In the recovery of oil from oil-bearing reservoirs, it usually is possible to recover only minor portions of the original oil in place by the so-called primary recovery methods which utilize only the natural forces present in the reservoir. Thus a variety of supplemental recovery techniques has been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus it has been proposed to add surfactants to the injected water in order to lower the oil-water interfacial tension and/or to alter the wettability characteristics of the reservoir rock. Also, it has been proposed to add thickening agents to all or part of the injected water in order to increase the viscosity thereof, thus decreasing the mobility ratio between the injected water and oil and improving the sweep efficiency of the waterflood.

Processes which involve the injection of aqueous surfactant solutions in order to reduce the oil-water interfacial tension are commonly referred to as low tension waterflooding techniques. To date one of the more promising low tension waterflooding techniques involves the injection of aqueous solutions of petroleum sulfonates within a designated equivalent weight range and under controlled conditions of salinity. For example, in a paper by W.R. Foster entitled "A Low-Tension Waterflooding Process", JOURNAL OF PETROLEUM TECHNOLOGY, Vol. 25, Feb. 1973, pp. 205–210, there is disclosed a procedure which involves the sequential injection of a protective slug, a surfactant slug, and a mobility control slug. The protective slug is an aqueous solution of sodium chloride which is injected in order to displace the reservoir water ahead of the subsequently injected surfactant slug. This slug is substantially free of divalent ions which would tend to precipitate the subsequently injected surfactant.

The surfactant slug comprises an aqueous solution of petroleum sulfonates and contains sodium chloride in a concentration, typically about 1.0 to 2.0 weight percent, which will promote the desired low interfacial tension between the injected water and the reservoir oil. The subsequently injected thickened water slug contains a viscosifier such as a water-soluble biopolymer in a graded concentration in order to provide an initial viscosity greater than the viscosity of the reservoir oil and a terminal viscosity near that of water. Thereafter a driving fluid such as produced field brine is injected in order to carry the process to conclusion.

Another waterflooding procedure, in which surfactants are formed in situ, involves alkaline waterflooding. In this process an aqueous solution of an alkali metal or ammonium hydroxide or carbonate is injected in order to neutralize organic acids in the reservoir oil to produce the corresponding alkali metal or ammonium salts. Alkaline waterflooding has been proposed in regard to various recovery mechanisms, i.e., to lower the interfacial tension between the reservoir oil and the injected water, to alter or even reverse the wettability of the reservoir, e.g., from oil-wet to water-wet, or for the purpose of mobility control by the formation of a relatively viscous oil and water emulsion.

An improved alkaline waterflooding process is described in U.S. Pat. No. 3,927,716 to Ralph F. Burdyn, Harry L. Chang, and William R. Foster, and entitled "ALKALINE WATERFLOODING PROCESS". In this process an aqueous alkaline solution is employed in which the alkalinity and monovalent salt salinity of the solution are controlled within defined ranges in order to result in low oil-water interfacial tensions which enhance the microscopic displacement of oil from the interstices of the reservoir rock. A thickened water slug may be used for the purpose of mobility control in the alkaline waterflood. As recognized in the Burdyn et al. patent, the results achieved by alkaline waterflooding and the roles played by the various recovery mechanisms involved depend to some extent upon the molecular weight distribution of the organic acids within the reservoir oil.

An additional factor which is relevant to the efficacy of an alkaline waterflood is the total acid content of the reservoir oil. This is commonly measured by the "acid number" which is defined as the milligrams of potassium hydroxide required to neutralize the acids in one gram of crude oil in a nonaqueous type titration. Various procedures have been proposed for the alkaline waterflooding of those reservoirs in which the crude oil is considered to have an inadequate acid content as indicated by the acid number. One technique disclosed in U.S. Pat. No. 3,195,629 to Leach involves the injection of air, peroxides, or other oxidizing agents into the reservoir in order to oxidize the oil in situ to form additional organic acids. Additionally, a preoxidized oil bank may be injected or high molecular weight acids may be added to the injected oil bank. In any case, an aqueous alkaline solution is injected in order to form the sodium salts of the organic acids. Yet a further technique disclosed in U.S. Pat. No. 3,344,858 to Gilchrist et al. involves an alkaline waterflood process in which an aqueous alkaline slug is injected first and then followed with a hydrocarbon slug containing organic acids. These acids are neutralized in situ to form the corresponding surface-active salts.

A further example of surfactant waterflooding is found in U.S. Pat. No. 3,804,171 to Krehbiel et al. which discloses the use of an anionic waterflood additive characterized as an overbased sulfonate. The overbased sulfonate is arrived at by adding a base component, such as an alkali metal hydroxide, carbonate or bicarbonate, to a sulfonate derived from a pale oil extract. The base component is added in an amount over that required to neutralize the sulfonte such that the ratio of the weight of excess base component to the weight of the sulfonate is within the range of 0.03 to 2.0 and desirably within the range of 0.20 to 1.0. Overbasing may be arrived at in situ or prior to injection. In the former case, the sulfonate derived from a pale oil extract may be injected into the formation and this sulfonate slug then followed by an effective amount of an alkali metal hydroxide or alkali metal carbonate solution.

A technique similar to that described above is disclosed in U.S. Pat. No. 3,804,170 to Krehbiel et al. In this patent, the overbased sulfonate is derived from heavy coker gas oil and in addition a sufficient amount of brine may be added to the slug of the anionic waterflood additive to provide a brine level in the reservoir of about 0.5 to 10 percent salt. Yet a further disclosure of employing an overbased anionic waterflood additive is found in U.S. Pat. No. 3,847,823 to Clark et al. In this case, the overbased component comprises a mixture of water-soluble sulfonate having an average equivalent weight of about 200 to about 400 and an oil-soluble sulfonate having an equivalent weight of about 400 to about 600. The sulfonates in the mixture are generally present in a ratio such that the average equivalent weight of the mixture is about 350 to 500, and desirably about 375 to about 475. The neutralized sulfonate mixture may be present in an amount within the range of 0.5 to 25 weight percent and may contain a chelating agent such as trisodium phosphate monohydrate to chelate calcium and/or magnesium ions.

SUMMARY OF THE INVENTION

In accordance with the present invention, there is provided a new and improved waterflooding process in which the interfacial tension between the reservoir oil and the injected water is reduced by the use of an alkaline agent which functions to convert organic acids within the reservoir to surface-active monovalent metal soaps and also a sulfonate surfactant. In carrying out the invention, an aqueous initiation slug containing an alkaline agent selected from the group consisting of alkali metal and ammonium hydroxides is injected into a subterranean reservoir via a suitable injection system. The reservoir contains oil having an acid number within the range of 0.1 to 1.0. Thereafter, an aqueous surfactant slug containing an alkaline agent and a sulfonate surfactant is injected. After injection of the surfactant slug, a suitable aqueous flooding medium is injected in order to displace oil in the reservoir to a production system from which it is recovered. Preferably, the pH of the aqueous initiation slug is greater than the pH of the surfactant slug. The alkaline agent preferred in carrying out the invention is sodium hydroxide which is present in the initiation slug in a concentration within the range of 0.005 to 0.1N and in the surfactant slug in a concentration within the range of 0.001 to 0.1N. Preferably, an alkyl aryl sulfonate exhibiting an average molecular (equivalent) weight within the range of 300 to 500 is employed in the surfactant slug. In addition, it is desirable to incorporate a monovalent metal salt such as sodium chloride in both the initiation slug and surfactant slug in an amount within the range of 0.2 to 2.0 weight percent.

BRIEF DESCRIPTION OF THE DRAWINGS

FIGS. 1 and 2 are interfacial tension maps showing the oil-water interfacial tensions achieved at different concentrations of sodium chloride and a petroleum sulfonate in neutral solutions and in solutions containing sodium hydroxide.

FIG. 3 is an illustration exhibiting one form of well pattern which may be employed in carrying out the present invention.

DESCRIPTION OF SPECIFIC EMBODIMENTS

Figure 2:
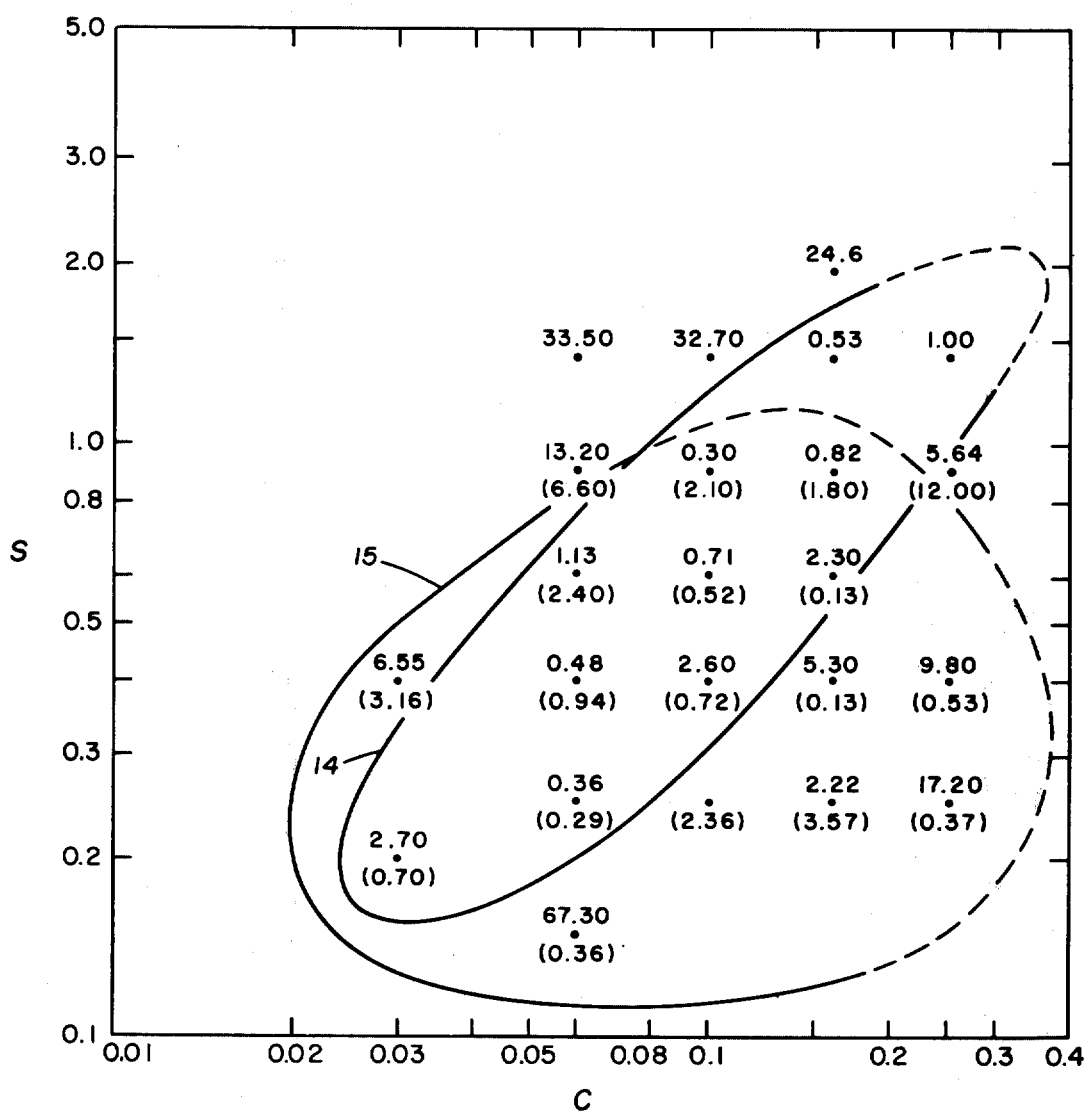

As noted previously, one of the recovery mechanisms involved in alkaline waterflooding, as well as in surfactant waterflooding, involves a reduction in the interfacial tension between the reservoir oil and the injected displacing water. An important consideration in the use of sulfonate surfactants and also in alkaline waterflooding is the monovalent salt salinity of the aqueous phase. Generally, the low oil-water interfacial tension required for optimum microscopic oil displacement occurs within a relatively narrow range of surfactant concentration and salinity. In the present invention, an alkaline agent and a sulfonate surfactant are both employed in the aqueous displacing medium in order to arrive in some instances at a lower interfacial tension than is produced by these additives alone and in addition to provide for a broader region of low interfacial tension in terms of salinity and surfactant concentration. In addition, the time required for a given sulfonate solution-crude oil system to reach equilibrium interfacial tension is reduced by the addition of the alkaline agent to the surfactant solution. In general, it was found that the time required to reach equilibrium interfacial tension was reduced from approximately 6 to 8 hours when employing the sulfonate alone to about 30 minutes with the addition of sodium hydroxide in an amount to give a pH of about 12. This acceleration of the equilibrium time is due to the fact that surface-active agents formed by neutralization of organic acids within the crude oil are formed at the oil-water interface immediately after contact of the oil and water phases. Thus the interface diffusion which is required for low interfacial tension in a neutral pH environment is eliminated.

In order to demonstrate the effect on oil-water interfacial tension of employing an alkaline agent in conjunction with a sulfonate surfactant, interfacial tension measurements were carried out on crude oil sulfonate-sulfonate solution systems with and without the addition of an alkaline agent.

In one set of experiments, the interfacial tension of a petroleum sulfonate solution against a crude oil having an acid number of 0.218 was measured at different concentrations of sodium chloride and sulfonate. The sulfonate employed was a petroleum sulfonate having an average molecular or equivalent weight of about 420 and available from the Witco Chemical Company under the trade name "Petronate TRS10-80". The interfacial tension measurements were obtained by means of the sessile drop technique.

The results of this first set of experiments are shown in FIG. 1 which is a plot of the interfacial tensions measured as a function of the sodium chloride concentration S, in weight percent, on the ordinate and the active petroleum sulfonate concentration C, in weight percent, on the abscissa. Curve 10 in FIG. 1 is an equal interfacial tension line drawn through the data points for a value of 5 millidynes per centimeter. The interfacial tensions given for the respective data points are in millidyne per centimeter.

A second set of experiments was performed for the same sulfonate-crude oil system except that in this case an alkaline agent was added to the aqueous phase. The alkaline agent employed was sodium hydroxide in a concentration of 0.01N to give a pH of 12. The interfacial tension measurements for the respective data points are given in FIG. 1 in parentheses and curve 12 of FIG. 1 is again an equal interfacial tension line at 5 millidynes per centimeter. For each of curves 10 and 12, the broken line portions of the curve are extrapolations into regions where measurements were not obtained.

From an examination of curves 10 and 12 in FIG. 1, it can be seen that the area of the 5 millidynes or less interfacial tension region was enlarged somewhat by the addition of the alkaline agent, with most of the enlargement of the low tension region occurring at the lower salinity values.

A similar set of comparative experiments was carried out to measure oil-water interfacial tensions between sulfonate solutions with and without an alkaline agent and a second crude oil exhibiting an acid number of 0.317.

The results of this set of experiments are illustrated in FIG. 2 in which curve 14 is a plot of a 5-millidyne equal interfacial tension line as a function of the sodium chloride concentration S on the ordinate and the petroleum sulfonate concentration C on the abscissa for the system containing no alkaline agent. Curve 15 in FIG. 2 is an equal interfacial tension line at 5 millidynes per centimeter for similar sulfonate solution-crude oil systems with the aqueous phase also containing 0.01N sodium hydroxide. As shown in FIG. 2, the addition of the alkaline agent again caused an enlargement in the low interfacial tension region particularly in the lower salinity concentrations and this effect was more pronounced for the crude oil exhibiting the somewhat higher acid number.

To further demonstrate the results obtained by the injection of an alkaline agent and sulfonate surfactant in accordance with the present invention, comparative oil displacement experiments were carried out to simulate waterflooding without the addition of chemicals (other than salt), polymer waterflooding only, surfactant waterflooding, alkaline waterflooding, and waterflooding employing an alkaline agent and a sulfonate surfactant in accordance with the present invention. The linear displacement experiments were performed in 3-foot-long flow tubes having an inside diameter of ¼ inch and packed in some cases with unconsolidated Berea sand and in other cases with unconsolidated reservoir sands as indicated below.

For each tube run, the sand packed tube was saturated with saline water with the amount of water necessary to achieve saturation being measured to determine the total pore volume amount within the tube. The tube then was flooded with oil until the effluent from the tube contained no water. The total amount of water displaced from the tube during this operation was measured in order to determine the initial oil saturation. Thereafter, the various injection formats described below were carried out to determine the residual oil saturation and the percent of original oil recovered.

Where thickened water was injected, the polymer employed was the ionic polysaccharide B-1459 produced by fermentation of glucose with the bacterium Xanthomonas campestris, NRRL-B-1459 U.S. Department of Agriculture, and available from the Kelco Chemical Company under the trade name "Kelzan". In each case, the alkaline agent employed was sodium hydroxide and the sulfonate surfactant was the petroleum sulfonate TRS10-80, identified previously. Sodium chloride was employed in each instance as the salinity control agent.

One set of comparative oil displacement experiments was carried out for the crude oil described previously with respect to FIG. 2 which exhibited an acid number of 0.317. Berea sand was used to pack the flow tubes. The results of this suite of experiments are summarized in Table I. Table I shows the initial oil saturation, $S_{oi}$, the residual or final oil saturation, $S_{or}$, the percent recovery, the total slug size in pore volume, the sodium chloride concentration in weight percent of three sequentially injected slugs I, II, and III, and the various other additive concentrations in the slugs.

Runs 1 through 5, respectively, show the results of continuous injection experiments for water, water containing Kelzan, water containing alkaline agent, water containing Kelzan and surfactant, and water containing Kelzan, surfactant, and alkaline agent. Runs 6 through 12 in Table I show the results achieved when simulating surfactant waterflooding employing the petroleum sulfonate TRS10-80 but without an alkaline agent and followed by a Kelzan slug. Runs 13 through 24 in Table I show the results achieved in displacement tests simulating the present invention employing an alkaline agent and sulfonate surfactant.

From an examination of the data presented in Table I, it can be seen that the displacement experiments employing alkaline agent and sulfonate surfactant produced, as a whole, higher oil recoveries than those displacement experiments employing only the petroleum sulfonate. For example, the average percent oil recovery for Runs 13 through 24 is 91.83 percent compared to 85.33 percent for Runs 6 through 12. Also a comparison of Runs 13, 17, and 21 shows that a somewhat higher oil recovery is achieved when employing the alkaline agent in the initial slug in a higher concentration than the alkaline agent in the surfactant slug. It will be noted that with respect to these runs, the pore volume amounts of slugs I and II are the same.

TABLE I

| Run No. | $S_{oi}$ (%) | $S_{or}$ (%) | Recovery (%) | Total Slug (PV) | NaCl (%) | Slug I Size (PV) | Slug I NaOH (N) | Slug II Size (PV) | Slug II NaOH (N) | Slug II Kelzan (ppm) | Slug II TRS10-80 (%) | Slug III NaOH (N) | Slug III Kelzan (ppm) |
|---|---|---|---|---|---|---|---|---|---|---|---|---|---|
| 1 | 69.72 | 23.53 | 66.24 | 1.61 | 1.00 | Continuous | Injection | — | — | 750 | — | — | — |
| 2 | 68.34 | 22.49 | 67.09 | 1.02 | 1.00 | Continuous | Injection | — | — | 750 | — | — | — |
| 3 | 69.53 | 18.32 | 73.65 | 2.34 | 1.00 | Continuous | Injection | — | 0.01 | — | — | — | — |
| 4 | 71.37 | 1.57 | 97.80 | 2.11 | 1.00 | Continuous | Injection | — | — | 750 | 0.20 | — | — |
| 5 | 68.80 | 0.00 | 100.00 | 1.85 | 1.00 | Continuous | Injection | — | 0.01 | 750 | 0.20 | — | — |
| 6 | 72.07 | 14.57 | 79.21 | 1.21 | 0.50 | — | — | 0.16 | — | — | 0.50 | — | 750 |
| 7 | 71.67 | 12.50 | 82.56 | 1.75 | 0.50 | — | — | 0.20 | — | — | 0.50 | — | 750 |
| 8 | 71.84 | 10.73 | 85.06 | 1.81 | 0.50 | — | — | 0.30 | — | — | 0.50 | — | 750 |
| 9 | 69.90 | 10.29 | 85.28 | 1.81 | 1.00 | — | — | 0.30 | — | — | 0.50 | — | 750 |
| 10 | 71.31 | 8.54 | 88.02 | 1.93 | 0.50 | — | — | 0.20 | — | — | 1.00 | — | 750 |
| 11 | 70.70 | 5.08 | 92.81 | 1.70 | 0.50 | — | — | 0.20 | — | — | 1.50 | — | 750 |
| 12 | 72.18 | 11.29 | 84.36 | 1.58 | 0.50 | — | — | 0.10 | — | — | 2.50 | — | 750 |
| 13 | 69.64 | 6.06 | 91.30 | 2.05 | 0.50 | 0.17 | 0.01 | 0.30 | 0.01 | — | 0.50 | 0.01 | 750 |
| 14 | 71.71 | 13.15 | 81.67 | 1.44 | 0.50 | 0.08 | 0.04 | 0.20 | 0.01 | — | 0.50 | 0.01 | 750 |
| 15 | 71.90 | 10.74 | 85.06 | 1.76 | 0.50 | 0.33 | 0.04 | 0.20 | 0.01 | — | 0.50 | 0.01 | 750 |
| 16 | 70.97 | 4.84 | 93.18 | 1.73 | 0.50 | 0.16 | 0.04 | 0.30 | 0.01 | — | 0.50 | — | 750 |

TABLE I-continued

| Run No. | $S_{oi}$ (%) | $S_{or}$ (%) | Recovery (%) | Total Slug (PV) | NaCl (%) | Slug I Size (PV) | Slug I NaOH (N) | Slug II Size (PV) | Slug II NaOH (N) | Slug II Kelzan (ppm) | TRS10-80 (%) | Slug III NaOH (N) | Slug III Kelzan (ppm) |
|---|---|---|---|---|---|---|---|---|---|---|---|---|---|
| 17 | 70.00 | 4.43 | 93.45 | 1.76 | 0.50 | 0.17 | 0.04 | 0.30 | 0.01 | — | 0.50 | 0.01 | 750 |
| 18 | 71.54 | 11.79 | 83.52 | 2.10 | 1.00 | 0.16 | 0.04 | 0.30 | 0.01 | — | 0.50 | 0.01 | 750 |
| 19 | 71.32 | 0.00 | 100.00 | 1.73 | 0.50 | 0.31 | 0.04 | 0.30 | 0.01 | — | 0.50 | 0.01 | 750 |
| 20 | 70.00 | 2.08 | 97.02 | 2.20 | 0.50 | 0.33 | 0.04 | 0.30 | 0.01 | — | 0.50 | 0.01 | 750 |
| 21 | 70.88 | 2.95 | 95.83 | 1.86 | 0.50 | 0.17 | 0.04 | 0.30 | 0.01 | — | 1.00 | 0.01 | 750 |
| 22 | 72.13 | 6.15 | 91.48 | 1.94 | 0.50 | 0.10 | 0.04 | 0.10 | 0.01 | — | 1.50 | — | 750 |
| 23 | 71.65 | 3.86 | 94.61 | 1.77 | 0.50 | 0.20 | 0.04 | 0.10 | 0.01 | — | 1.50 | — | 750 |
| 24 | 70.97 | 3.63 | 94.89 | 1.70 | 0.50 | 0.30 | 0.04 | 0.10 | 0.01 | — | 1.50 | — | 750 |

Table II shows the results of another set of oil displacement experiments carried out for the crude oil described with respect to FIG. 1 having an acid number of 0.218. These tests were also conducted as tube runs as described previously employing Berea sand packed columns. Run 1 shows the oil recovery achieved when employing the petroleum sulfonate TRS10-80 but without the inclusion of an alkaline agent and Runs 2 through 5 illustrate the results achieved when employing an alkaline agent and sulfonate surfactant in accordance with the present invention. From an examination of Table II, it will be recognized that again higher oil recoveries were achieved during Runs 2 through 5 than for Run 1. The average of the percent oil recovery for these runs was 89.7 percent representing an increase of 14.2 percent over the oil recovery obtained for Run 1 employing the sulfonate only. It may be noted here that this figure is somewhat higher than the corresponding increase of 7.6 percent for the experiments tabulated in Table I notwithstanding the somewhat lower acid number of the crude oil involved.

Table III illustrates the results of additional displacement tests carried out with respect to the same crude oil as used in the runs reported in Table II but employing reservoir sand rather than Berea sand. The reservoir sand in this case was disaggregated from dry core materials and then packed into the tubes. The sand was not subjected to any chemical cleaning prior to packing into the tubes.

In the displacement tests summarized in Table III, an initial protective slug was injected for every run except for Run 4. The protective slug which is not shown in the table was injected in an amount of 0.3 pore volume and comprised fresh field water containing 0.6 percent sodium chloride. Runs 1, 3, 4, and 6 were carried out at room temperature and Runs 2 and 5 were carried out at 60° C. Runs 1 through 4 were conducted as continuous injections, as indicated, and Runs 5 and 6 involved the injection of four discrete slugs. These included slugs II and III as indicated in the table, the protective slug mentioned earlier and a final driving slug. In Run 5, the driving fluid was a 0.6 weight percent sodium chloride solution and in Run 6 the driving fluid was a 0.6 weight percent sodium chloride containing 750 ppm of Kelzan.

Each of the displacing mediums employed contained 0.6 percent sodium chloride with the exception of Run 2. Here the water employed was a field water containing about six weight percent sodium chloride as well as over 1400 ppm divalent metal ions (calcium, magnesium, and barium).

Runs 1 and 2 in Table III represent base cases in which continuous injection was carried out employing the aqueous salt solutions as indicated without additional additives. Run 3 represents a base case employing continuous injection of Kelzan and Run 4 a base case of continuous injection of alkaline agent. Runs 5 and 6 represent injection schedules employing alkaline agent and a sulfonate surfactant in accordance with the present invention.

TABLE II

| Run No | $S_{oi}$ (%) | $S_{or}$ (%) | Recovery (%) | Total Slug (PV) | Slug I Size (PV) | Slug I NaOH (N) | Slug II Size (PV) | Slug II TRS10-80 (%) | Slug II NaOH (N) | Slug III Size (PV) | Slug III Kelzan (ppm) |
|---|---|---|---|---|---|---|---|---|---|---|---|
| 1 | 69.42 | 14.88 | 78.57 | 1.50 | — | — | 0.10 | 1.50 | — | 1.40 | 750 |
| 2 | 68.38 | 9.40 | 86.25 | 1.45 | 0.20 | 0.04 | 0.10 | 1.50 | 0.01 | 1.15 | 750 |
| 3 | 68.96 | 6.90 | 90.00 | 1.45 | 0.30 | 0.04 | 0.10 | 1.50 | 0.01 | 1.05 | 750 |
| 4 | 69.42 | 4.96 | 92.86 | 1.83 | 0.30 | 0.04 | 0.20 | 1.50 | 0.01 | 1.33 | 750 |
| 5 | 70.00 | 7.27 | 89.63 | 1.88 | 0.40 | 0.04 | 0.10 | 1.50 | 0.01 | 1.38 | 750 |

TABLE III

| Run No. | $S_{oi}$ (%) | $S_{or}$ (%) | Recovery (%) | Total Slug (PV) | NaCl (%) | Slug II Size (PV) | Slug II NaOH (N) | Slug III Size (PV) | Slug III TRS-80 (%) | Slug III NaOH (N) |
|---|---|---|---|---|---|---|---|---|---|---|
| 1 | 56.15 | 23.08 | 58.90 | 1.90 | 0.60 | Continuous | Injection | | | |
| 2 | 54.70 | 23.07 | 57.80 | 1.50 | | Continuous | Injection | | | |
| 3 | 58.12 | 21.37 | 63.12 | 1.66 | 0.60 | Continuous | Injection | of 750 ppm Kelzan | | |
| 4 | 56.00 | 20.80 | 62.86 | 2.00 | 0.60 | Continuous | Injection 0.04 | | | |
| 5 | 55.46 | 5.88 | 89.39 | 2.00 | 0.60 | 0.30 | 0.04 | 0.20 | 1.50 | 0.01 |
| 6 | 55.74 | 12.30 | 77.94 | 1.77 | 0.60 | 0.30 | 0.04 | 0.20 | 1.50 | 0.01 |

The alkaline agent employed in carrying out the present invention is selected from the group consisting of the alkali metal and ammonium hydroxides. Usually it will be desirable to employ one of the alkali metal hydroxides since they are stronger bases than ammonium hydroxide. Of these, sodium hydroxide normally will usually be preferred from the standpoint of economy and availability. However, ammonium hydroxide may be added in some instances — particularly in those reservoirs where adsorption is a serious problem since within the desired pH ranges the ammonium hydroxide may be added in greater concentrations than the alkali metal hydroxides.

As noted previously, the surfactant slug containing the sulfonate surfactant and alkaline agent is preceded by an aqueous initiation slug also containing an alkaline agent. The prior injected initiation slug acts to produce surfactants in situ through the neutralization of organic acids prior to the reservoir being contacted by the surfactant slug. Preferably, the alkaline agent is added to the initiation slug in an amount necessary to provide a solution pH of 11.5 to 13, corresponding to a concentration in the case of sodium hydroxide of from 0.005 to 0.1N. The pH of the subsequently injected surfactant slug preferably is within the range of 11 to 13. It usually will be preferred in carrying out the present invention to provide a concentration of alkaline agent in the surfactant slug which is somewhat lower than the concentration of alkaline agent in the initiation slug. Where sodium hydroxide or another alkali metal hydroxide is employed, the concentration of alkaline agent within the surfactant slug is within the range of 0.001 to 0.1N.

As noted in the paper by Foster and in the Burdyn et al. patent referred to previously, the salinity of a surfactant solution or an alkaline solution may be adjusted within desired ranges in order to arrive at a low interfacial tension between the injected water and the reservoir oil. It is preferred in carrying out the present invention to adjust the monovalent salt salinity of both the initiation slug and the surfactant slug in order to enhance the interfacial tension reduction mechanism involved in the displacement of the reservoir oil by the injected water. In most cases, the preferred monovalent salt salinity will be within the range of 0.2 to 2.0 weight percent. Sodium chloride normally will be used to adjust the salinity of the initiation slug and the surfactant slug within the desired range since it is economical and usually readily available.

Many sulfonate-type surfactants are known in the detergent art and have been proposed for use in waterflooding and such surfactants may be employed in practicing the present invention.

Preferably an alkyl aryl sulfonate having an average molecular weight within the range of 300 to 500 will be used. While the selection of a particular sulfonate is somewhat specific with regard to the reservoir oil-injection water system involved, normally the use of alkyl aryl sulfonates within this molecular weight range will lead to the desired interfacial tensions of 0.005 dyne per centimeter or less. The sulfonate molecular weights set forth herein and in the appended claims are calculated as equivalent weights for the sodium form assuming 100 percent monosulfonation.

The alkyl aryl sulfonates may be the so-called synthetic sulfonates such as those derived from sulfonation of products such as keryl benzenes or they may be petroleum sulfonates derived from sulfonation of petroleum oils or petroleum oil fractions. Normally the petroleum sulfonates will be used since they are more economical than the synthetics and since they usually provide a mixture of sulfonates having fairly wide molecular weight distribution which is helpful in arriving at the desired low interfacial tension.

Commercially available petroleum sulfonates commonly are marketed as products containing about 50 to 80 percent active sulfonates with the remainder constituting impurities such as oil, water, and sodium sulfate and other inorganic salts. Sulfonate concentrations as set forth herein are given on a weight percent active basis excluding the presence of the impurities which may be present in the product.

It will be recalled from the previous discussion of the data presented in FIGS. 1 and 2 that the low interfacial tension region of 0.005 dyne per centimeter or less occurred for petroleum sulfonate concentrations of about 0.02 or 0.03 to about 0.4 weight percent. In actual practice, it normally will be desirable to employ somewhat higher sulfonate concentrations in order to accommodate adsorption of the surfactant on the reservoir rock surfaces. Thus it is preferred in carrying out the present invention to employ the sulfonate surfactant in an amount within the range of 0.1 to 2.0 weight percent.

The invention is most applicable to reservoirs of low to intermediate acid content. In most cases the reservoir oil should exhibit an acid number of at least 0.1 in order for there to be a significant quantity of organic acids available for conversion to the surface-active soaps. For reservoir oils having an acid number greater than 1.0, the use of a sulfonate surfactant in accordance with the invention normally will not result in greater oil recovery than that attained by straight alkaline waterflooding.

A thickening agent may be employed for mobility control purposes. The thickening agent may be added to the initiation slug and/or to the surfactant slug. Usually, however, it will be peferred to inject the thickening agent in a mobility control slug subsequent to the injection of the surfactant slug and to adjust the alkalinity and salinity of the mobility control slug for reasons taught in the aforementioned Burdyn et al. application. Preferably, the monovalent salt salinity of the mobility control slug is within the range of 0.2 to 2.0 weight percent similarly as the initiation slug and the surfactant slug. The pH of the mobility control slug preferably is within the range of 11.0 to 13.0 and the concentration of the alkaline agent less than the alkaline agent concentration in the initiation slug.

Various thickening agents which may be employed to increase the viscosity or apparent viscosity of the mobility control slug are well known to those skilled in the art and include such naturally occurring materials as guar gum or Karaya gum, or such synthetic materials as the polysaccharide "Kelzan" described previously, poly(glucosylglucan)s, such as disclosed in U.S. Pat. No. 3,372,749 to Williams, and available from the Pillsbury Company under the trade name "Polytran", or the partially hydrolyzed polyacrylamides available from the Dow Chemical Company under the trade name of "Pusher Chemicals". An ionic polysaccharide such as Kelzan usually will be preferred as the thickening agent for reasons set forth more fully in the aforementioned Burdyn et al. application.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in FIG. 3. In this Figure, the legend o is used to indicate a production well and the legend ● is used to indicate an injection well. As shown in FIG. 3, this integrated pattern comprises a plurality of five-spot patterns each of which comprises a central production well, as indicated by reference character 16, and four peripheral injection wells, as indicated by reference numerals 17, 18, 19, and 20. By the term "pore volume" as used herein is meant the pore volume of the formation underlying the well pattern defined by the wells comprising the injection and production systems. Thus, the term pore volume as used with reference to the pattern shown in FIG. 3 is the pore volume of that portion of the formation underlying the area enclosed by broken line 22. Of course, other well arrangements may be used in carrying out the present invention, examples of which are set forth in the previously mentioned Burdyn et al. patent.

With respect to quantities of the displacing fluids employed in the present invention, the aqueous initiation slug preferably is injected in an amount within the range of 0.02 to 0.2 pore volume. The initiation slug may be, and in most cases will be, preceded by an aqueous protective slug in the event the reservoir water contains divalent metal ions in excess of about 50 parts per million or if the reservoir water should contain relatively high concentrations of monovalent salt such as sodium chloride. The aqueous protective slug, if employed, should exhibit a monovalent salt salinity no higher than the range previously mentioned for the initiation slug and normally will be injected in an amount of up to about 1.0 pore volume.

Preferably the aqueous surfactant slug is injected in an amount within the range of 0.1 to 0.5 pore volume. This slug, like the initiation slug, should be relatively free of calcium or other divalent metal ions. Normally the divalent metal ion concentration should be less than 50 parts per million.

The relatively viscous mobility control slug, if employed, preferably is injected in an amount within the range of 0.05 to 0.3 pore volume. The viscosity of the mobility control slug desirably is graded at its leading and trailing edges between the viscosity of water and a maximum viscosity which is at least as great as the viscosity of the reservoir oil, and in any case greater than the viscosity of the preceding initiation and surfactant slugs. This is accomplished by progressively increasing the concentration of the polymeric thickening agent to its maximum value, normally within the range of 250 to 2500 parts per million in the case of Kelzan, at its leading edge and then decreasing the concentration to zero at its trailing edge. The thickening agent concentration may be increased and decreased linearly or nonlinearly by increments.

Subsequent to the injection of the mobility control slug, a driving fluid is injected in order to displace the previously injected fluids through the formation. The driving fluid typically may be any water which is locally available and is not incompatible with the formation. The driving fluid is injected in such amount, normally within the range of 0.5 to 1.0 pore volume, as is necessary to carry the displacement process to completion.

We claim:

1. In the recovery of oil from a subterranean oil reservoir penetrated by spaced injection and production systems, said reservoir containing oil having an acid number within the range of 0.1 to 1.0, the method comprising:

a. injecting into said reservoir via said injection system an aqueous initiation slug containing an alkaline agent selected from the group consisting of alkali metal and ammonium hydroxides to neutralize organic acids in said reservoir to surface-active soaps, b. thereafter injecting into said reservoir via said injection system an aqueous surfactant slug containing a sulfonate surfactant and an alkaline agent selected from the group consisting of alkali metal and ammonium hydroxides, c. thereafter injecting into said reservoir via said injection system an aqueous flooding medium to displace oil to said production system, and d. recovering oil from said production system.

2. The method of claim 1 wherein the pH of said aqueous initiation slug is within the range of 11.5 to 13 and the pH of said aqueous surfactant slug is within the range of 11 to 13.

3. The method of claim 1 wherein the concentration of alkaline agent in said surfactant slug is lower than the concentration of alkaline agent in said initiation slug.

4. The method of claim 1 wherein said initiation slug and said surfactant slug each exhibit a monovalent salt salinity within the range of 0.2 to 2.0 weight percent.

5. The method of claim 1 wherein said initiation slug is injected in an amount within the range of .02 to 0.2 pore volume.

6. The method of claim 1 wherein said surfactant slug is injected in an amount within the range of 0.1 to 0.5 pore volume.

7. The method of claim 1 wherein said sulfonate surfactant is an alkyl aryl sulfonate having an average molecular weight within the range of 300 to 500.

8. The method of claim 7 wherein said alkyl aryl sulfonate is present in an amount within the range of 0.1 to 2.0 weight percent.

9. The method of claim 1 wherein said alkaline agent present in said initiation and surfactant slugs is sodium hydroxide.

10. The method of claim 9 wherein the sodium hydroxide concentration of said initiation slug is within the range of 0.005 to 0.1N and the sodium hydroxide concentration of said surfactant slug is within the range of 0.001 to 0.1N.

11. In the recovery of oil from a subterranean oil reservoir penetrated by spaced injection and production systems, said reservoir containing oil having an acid number within the range of 0.1 to 1.0, the method comprising:

a. injecting into said reservoir via said injection system an aqueous initiation slug containing an alkali metal hydroxide in a concentration within the range of 0.005 to 0.1N to neutralize organic acids in said reservoir to surface-active soaps, b. thereafter injecting into said reservoir via said injection system an aqueous surfactant slug containing an alkyl aryl sulfonate having an average molecular weight within the range of 300 to 500 and an alkali metal hydroxide in a concentration within the range of 0.001 to 0.1N, c. thereafter injecting into said reservoir via said injection system an aqueous flooding medium to displace oil to said production system, and d. recovering oil from said production system.

12. The method of claim 11 wherein said aqueous initiation and surfactant slugs each have a monovalent salt salinity within the range of 0.2 to 2.0 weight percent.

13. The method of claim 12 wherein said alkyl aryl sulfonate comprises a mixture of petroleum sulfonates and is present in an amount within the range of 0.1 to 2.0 weight percent.

14. The method of claim 13 wherein the concentration of alkali metal hydroxide in said surfactant slug is lower than the concentration of alkaline agent in said initiation slug.

15. The method of claim 14 wherein said alkali metal hydroxide comprises sodium hydroxide.

16. The method of claim 15 wherein said initiation slug is injected in an amount within the range of 0.02 to 0.2 pore volume and said surfactant slug is injected in an amount within the range of 0.1 to 0.5 pore volume.

17. The method of claim 16 wherein at least a portion of the aqueous flooding medium injected subsequent to said surfactant slug comprises a mobility control slug containing a thickening agent.

18. The method of claim 17 wherein said mobility control slug contains an alkaline agent and is injected in an amount within the range of 0.05 to 0.3 pore volume.

* * * * *